United States Patent
Adamson et al.

(10) Patent No.: US 11,692,096 B2
(45) Date of Patent: Jul. 4, 2023

(54) COMPOSITION AND METHOD

(71) Applicant: LANKEM LTD., Dukinfield (GB)

(72) Inventors: John Adamson, Dukinfield (GB); Samuel Thomas Adamson, Dukinfield (GB)

(73) Assignee: LANKEM LTD., Dukinfield (GB)

( * ) Notice: Subject to any disclaimer, the term of this patent is extended or adjusted under 35 U.S.C. 154(b) by 102 days.

(21) Appl. No.: 17/277,933

(22) PCT Filed: Jul. 2, 2019

(86) PCT No.: PCT/GB2019/051877
§ 371 (c)(1),
(2) Date: Mar. 19, 2021

(87) PCT Pub. No.: WO2020/058664
PCT Pub. Date: Mar. 26, 2020

(65) Prior Publication Data
US 2021/0347983 A1     Nov. 11, 2021

(30) Foreign Application Priority Data
Sep. 19, 2018 (GB) .................................... 1815262

(51) Int. Cl.
| | | |
|---|---|---|
| *C08L 63/00* | (2006.01) | |
| *C08G 59/02* | (2006.01) | |
| *C08G 59/14* | (2006.01) | |
| *C08L 63/10* | (2006.01) | |
| *C08G 59/34* | (2006.01) | |
| *C09K 23/16* | (2022.01) | |

(52) U.S. Cl.
CPC ............ *C08L 63/10* (2013.01); *C08G 59/027* (2013.01); *C08G 59/1444* (2013.01); *C08G 59/1477* (2013.01); *C08G 59/34* (2013.01); *C09K 23/16* (2022.01)

(58) Field of Classification Search
CPC .............. C08G 59/027; C08G 59/1438; C08G 59/1444; C08G 59/1477; C08L 63/00
USPC ........................................................ 523/400
See application file for complete search history.

(56) References Cited

U.S. PATENT DOCUMENTS

| | | | |
|---|---|---|---|
| 2,819,278 A | 7/1958 | De Groote et al. | |
| 3,066,159 A | 11/1962 | De Groote et al. | |
| 4,597,799 A | 7/1986 | Schilling | |
| 4,923,642 A | 5/1990 | Rutzen et al. | |
| 4,975,090 A | 12/1990 | Brehm et al. | |
| 5,284,496 A | 2/1994 | Baillargeon et al. | |
| 5,403,440 A | 4/1995 | Daute et al. | |
| 6,320,064 B1 | 11/2001 | Oftring et al. | |
| 9,085,709 B1 | 7/2015 | Lele | |
| 2010/0292492 A1 | 11/2010 | Geng et al. | |
| 2010/0324185 A1 | 12/2010 | Geng et al. | |
| 2013/0225859 A1* | 8/2013 | Allen ........................ | C11D 1/90 |
| | | | 560/205 |
| 2019/0177655 A1* | 6/2019 | Garbark .................. | C11D 1/74 |

FOREIGN PATENT DOCUMENTS

| | | | |
|---|---|---|---|
| EP | 2631289 A1 | 8/2013 | |
| GB | 1037021 A * | 7/1966 | ............ A01N 25/30 |
| GB | 2562172 A | 11/2018 | |
| WO | 91/06531 A1 | 5/1991 | |
| WO | 2019118456 A1 | 6/2019 | |

OTHER PUBLICATIONS

Shikhaliev K., et al. "Epoxidized methyl esters and triglycerides of vegetable oil unsaturated fatty acids etc," Preprints, Dec. 25, 2017.
Biswas et al., "Synthesis of diethylamine-functionalised soybean oil, suitable for use as a surfactant," Journal of Agricultural and Food Chemistry 53 (2005).
International application No. PCT/US2018/064945; International filing date: Dec. 11, 2018 (Dec. 12, 2018) Document type: Certified priority document; Document details: Country/Office: US, U.S. Appl. No. 62/597,273, filed Dec. 11, 2017 (Dec. 11, 2017); Date of receipt at the International Bureau: Jan. 14, 2019 (Jan. 14, 2019); Remark: Priority document submitted or transmitted to the International Bureau in compliance with Rule 17.1(a),(b) or (b-bis).

* cited by examiner

*Primary Examiner* — Michael J Feely
(74) *Attorney, Agent, or Firm* — Innovators Legal

(57) ABSTRACT

A surfactant comprising the reaction product of: (a) an epoxidised carboxylic acid ester; and (b) a compound including at least one reactive alcohol and/or amino functional group.

16 Claims, No Drawings

COMPOSITION AND METHOD

CROSS-REFERENCE TO RELATED APPLICATIONS

This application is the 35 U.S.C. § 371 national stage application of PCT Application No. PCT/GB2019/051877, filed Jul. 2, 2019, where the PCT claims priority to, and the benefit of, GB application entitled "COMPOSITION AND METHOD," having application no. 1815262.9, filed Sep. 19, 2018. PCT/GB2019/051877 and GB 1815262.9 are herein incorporated by reference in their entireties.

The present invention relates to surfactant compounds and to methods and uses relating thereto. In particular the invention relates to surfactant compounds prepared from renewable sources and to uses of such compounds.

Surfactants ("surface active agents") reduce the surface tension at interfaces between different phases of matter. They are used in a very wide range of applications such as household cleaning products, toiletries, personal care, cosmetics, industrial and institutional cleaning, emulsion polymerisation, dispersions, oilfield, metal working, agrochemicals, fuel additives and coatings. Their properties include emulsification, wetting, high and low foaming, dispersing, solubilisation and detergency.

Due to the wide variety of possible uses of surfactant compounds, and the huge variability of the compositions in which they are included, there is a continuing need to provide surfactant compounds having differing structures.

In recent times there has been mounting public and regulatory pressure for industrial processes to reduce their environmental impact, including processes using surfactants. One method of reducing the environmental impact of an industrial process is to reduce its dependency on non-renewable materials. Thus, it is desirable that surfactants can be obtained from renewable sources.

There is also a continuing need for new surfactant compounds which may exhibit different properties to existing compounds.

According to a first aspect of the present invention, there is provided a surfactant comprising the reaction product of:
(a) an epoxidised carboxylic acid ester; and
(b) a compound including at least one reactive alcohol and/or amino functional group.

According to a second aspect of the present invention, there is provided a method of preparing a surfactant, the method comprising reacting:
(a) an epoxidised carboxylic acid ester; and
(b) a compound including at least one reactive alcohol and/or amino functional group.

Preferred features of the first and second aspects will now be described.

Component (a) comprises an epoxidised carboxylic acid ester. The epoxidised carboxylic acid ester (a) may comprise an ester of a monocarboxylic acid or a polycarboxylic acid, for example a dicarboxylic acid. In embodiments in which component (a) comprises an ester of a polycarboxylic acid, suitably each acid group is esterified.

Preferably component (a) comprises an ester of formula $RCOOR^1$ in which R is a hydrocarbyl group including an epoxy functional group and $R^1$ is a hydrocarbyl group.

R is suitably an alkyl, alkenyl or aralkyl group comprising at least one epoxy functional group and $R^1$ is suitably an alkyl or aryl group.

R comprises at least one epoxy functional group. It may comprise more than one epoxy functional group. R is suitably an alkyl, alkenyl or aralkyl group having one or more epoxy substituents, preferably one or two epoxy substituents. Preferably R is an epoxy substituted alkyl or alkenyl group.

In preferred embodiments, the or each epoxy functional group is a secondary epoxy group. By secondary epoxy group, we mean an epoxy group wherein both carbon atoms of the epoxide ring are bound to a further carbon atom, i.e. the epoxy moiety is preferably not at a terminal position.

Suitably the epoxidised carboxylic acid ester (a) comprises one to four, preferably one to three, more preferably one or two epoxy groups. In some preferred embodiments, the epoxidised carboxylic acid ester (a) contains one epoxy group. In some preferred embodiments, the epoxidised carboxylic acid ester (a) contains two epoxy groups.

In some embodiments R may include one or more further substituents in addition to the one or more epoxy substituents. In preferred embodiments the one or more epoxy groups are the only substituents of the alkyl, alkenyl or aralkyl group R.

In some embodiments R is an epoxy substituted alkenyl group. Suitably the alkenyl group may comprise one or more double bonds, for example one, two or three double bonds, suitably one or two double bonds.

Preferably R is an epoxy substituted alkyl group.

Preferably R is an aliphatic group, more preferably an unbranched aliphatic group.

Suitably R has at least 6 carbon atoms, preferably at least 8 carbon atoms, more preferably at least 10 carbon atoms. R may have up to 36 carbon atoms, suitably up to 30 carbon atoms, preferably up to 26 carbon atoms, for example up to 24 carbon atoms. In preferred embodiments R has from 6 to 26 carbon atoms, more preferably from 8 to 24 carbon atoms, most preferably from 10 to 22 carbon atoms.

Component (a) may comprise a mixture of compounds including mixtures of homologues in which the groups R have different numbers of carbon atoms. Natural sources of carboxylic acids typically contain mixtures of compounds.

R may be straight chain or branched. Preferably R is straight chain.

Preferably $R^1$ is an alkyl or aryl group. More preferably $R^1$ is an alkyl group.

Preferably $R^1$ is an unsubstituted alkyl group.

$R^1$ has at least 1 carbon atom. Suitably $R^1$ has up to 22 carbon atoms, preferably up to 20 carbon atoms, more preferably up to 18 carbon atoms. In preferred embodiments $R^1$ has from 1 to 18 carbon atoms, preferably from 1 to 12 carbon atoms, for example from 1 to 8 carbon atoms. $R^1$ may be straight chain or branched.

$R^1$ may be selected from methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 1,1-dimethylpropyl, 1,2-dimethylpropyl, 2,2-dimethylpropyl, 1-ethylpropyl, hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, 1-methylhexyl, 2-methylhexyl, 3-methylhexyl, 4-methylhexyl, 5-methylhexyl, 1,1-dimethylpentyl, 1,2-dimethylpentyl, 1,3-dimethylpentyl, 1,4-dimethylpentyl, 2,2-dimethylpentyl, 2,3-dimethylpentyl, 2,4-dimethylpentyl, 3,3-dimethylpentyl, 3,4-dimethylpentyl, 4,4-dimethylpentyl, 1-ethylpentyl, 2-ethylpentyl, 3-ethylpentyl, 1,1,2-trimethylbutyl, 1,1,3-trimethylbutyl, 1,2,2-trimethylbutyl, 1,2,3-trimethylbutyl, 1,3,3-trimethylbutyl, 2,2,3-trimethylbutyl, 2,3,3-trimethylbutyl, 1-ethyl-1-methylbutyl, 1-ethyl-2-methylbutyl, 1-ethyl-3-methylbutyl, 2-ethyl-1-methylbutyl, 2-ethyl-2-methylbutyl, 2-ethyl-3-methylbutyl, 1-propylbutyl, octyl, 1-methylheptyl, 2-methylheptyl, 3-methylheptyl, 4-methylheptyl, 5-methylheptyl, 6-methylheptyl, 1,1-dimethylhexyl, 1,2-dimethylhexyl, 1,3-dimethylhexyl, 1,4-dimethylhexyl, 1,5-dimethylhexyl, 2,2-dimethylhexyl, 2,3-dimethylhexyl, 2,4-dimethylhexyl, 2,5-dimethylhexyl, 3,3-dimethylhexyl, 3,4-dimethylhexyl, 3,5-dimethylhexyl, 4,4-dimethylhexyl, 4,5-dimethylhexyl, 5,5-dimethylhexyl, 1-ethylhexyl, 2-ethylhexyl, 3-ethylhexyl, 4-ethylhexyl, 1,1,2-trimethylpentyl, 1,1,3-trimethylpentyl, 1,1,4-trimethylpentyl, 1,2,2-trimethylpentyl, 1,2,3-trimethylpentyl, 1,2,4-trimethylpentyl, 1,3,3-trimethylpentyl, 1,3,4-trimethylpentyl, 1,4,4-trimethylpentyl, 2,2,3-trimethylpentyl, 2,2,4-trimethylpentyl, 2,3,3-trimethylpentyl, 2,3,4-trimethylpentyl, 2,4,4-trimethylpentyl, 3,3,4-trimethylpentyl, 3,4,4-trimethylpentyl, 1-ethyl-1-methylpentyl, 1-ethyl-2-methylpentyl, 1-ethyl-3-methylpentyl, 1-ethyl-4-methylpentyl, 2-ethyl-1-methylpentyl, 2-ethyl-2-methylpentyl, 2-ethyl-3-methylpentyl, 2-ethyl-4-methylpentyl, 3-ethyl-1-methylpentyl, 3-ethyl-2-methylpentyl, 3-ethyl-3-methylpentyl, 3-ethyl-4-methylpentyl, 1,1,2,2-tetramethylbutyl, 1,1,2,3-tetramethylbutyl, 1,1,3,3-tetramethylbutyl, 1,2,2,3-tetramethylbutyl, 1,2,3,3-tetramethylbutyl, 1-ethyl-1,2-dimethylbutyl, 1-ethyl-1,3-dimethylbutyl, 1-ethyl-2,2-dimethylbutyl, 1-ethyl-2,3-dimethylbutyl, 1-ethyl-3,3-dimethylbutyl, 2-ethyl-1,1-dimethylbutyl, 2-ethyl-1,2-dimethylbutyl, 2-ethyl-1,3-dimethylbutyl, 2-ethyl-2,3-dimethylbutyl, 2-ethyl-3,3-dimethylbutyl, 1,1-diethylbutyl, 1,2-diethylbutyl, or 2,2-diethylbutyl.

Preferably $R^1$ is methyl or 2-ethylhexyl. More preferably R' is methyl.

Preferably substantially all of the acid groups of the epoxidised carboxylic acid ester are esterified. Preferably the epoxidised carboxylic acid ester suitably contains less than 10%, suitably less than 5%, suitably less 4%, suitably less than 3%, suitably less than 2%, preferably less than 1% free acid groups based on the total number of free acid groups and esterified acid groups.

Suitably component (a) comprises an epoxidised fatty acid ester. Suitably in the fatty acid R is an unbranched aliphatic group, preferably having 4 to 28 carbon atoms, for example 10 to 24 carbon atoms. Suitably component (a) is obtained by the epoxidation of a fatty acid, preferably a naturally occurring fatty acid.

Suitably component (a) is derived from an unsaturated (including polyunsaturated) fatty acid.

Suitably the epoxidised carboxylic acid ester (a) is derived from an unsaturated fatty acid selected from myristoleic acid, palmitoleic acid, sapienic acid, oleic acid, elaidic acid, vaccenic acid, gadoleic acid, eicosenoic acid, erucic acid, nervonic acid, linoleic acid, eicosadienoic acid, docosadienoic acid, linolenic acid, α-linoleic acid, pinolenic acid, eleostearic acid, mead acid, dihomo-γ-linolenic acid, eicosatrienoic acid, stearidonic acid, arachidonic acid, eicosatetraenoic acid, adrenic acid or mixtures thereof.

In preferred embodiments the epoxidised carboxylic acid ester (a) is derived from a naturally occurring unsaturated fatty acid or a combination of naturally occurring unsaturated fatty acids. In one especially preferred embodiment the epoxidised carboxylic acid ester (a) is derived from soybean oil fatty acid.

Thus component (a) preferably comprises an epoxidised soybean oil ester.

Suitable epoxidised fatty acid esters include epoxidised soybean oil 2-ethylhexyl ester and epoxidised soybean oil methyl ester.

Component (a) may comprise a mixture of compounds.

Naturally occurring fatty acids typically comprise mixtures of compounds.

In embodiments in which component (a) is derived from a polyunsaturated fatty acid, the compound may comprise one or more epoxy groups. In some such embodiments component (a) may comprise compounds in which all of the alkene functional groups are epoxidised and/or it may comprise compounds in which one or more alkene groups are epoxidised and one or more alkene groups remain unreacted.

In some embodiments component (a) may comprise at least one epoxidised carboxylic acid ester containing one epoxy group and at least one epoxidised carboxylic acid ester containing at least two epoxy groups, suitably two epoxy groups.

Some epoxidised carboxylic acid esters (a) are commercially available. Such compounds may also be prepared from unsaturated carboxylic acids and/or esters thereof by methods known to those skilled in the art.

Unsaturated carboxylic acid esters are typically obtained from natural sources by transesterification of naturally occurring triglycerides and/or by esterification of the alcohol and the fatty acid.

Component (b) comprises a compound including at least one reactive alcohol and/or amino functional group. Such groups are suitably able to react with epoxy groups. Suitably the reactive alcohol and/or amino functional groups are especially able to react with secondary epoxy groups.

Preferably component (b) comprises a compound which includes at least two reactive alcohol and/or amino functional groups. In some embodiments the compound may include at least three reactive alcohol and/or amino functional groups. In some embodiments the compound may include at least four reactive alcohol and/or amino functional groups. Component (b) preferably comprises a compound including two reactive alcohol and/or amino functional groups.

In some embodiments component (b) includes a compound having one reactive alcohol functional group. In some embodiments component (b) includes a compound having two reactive alcohol functional groups. In some embodiments component (b) includes a compound having one reactive amino functional group. In some embodiments component (b) includes a compound having two reactive amino functional groups. In some embodiments component (b) includes a compound having one reactive alcohol functional group and one reactive amino functional group.

In embodiments where component (b) includes a compound having reactive alcohol functional groups, the reactive alcohol functional groups are preferably primary alcohol groups.

In embodiments where component (b) includes a compound having reactive amino functional groups, the reactive amino functional groups are suitably primary amino groups or secondary amino groups. In preferred embodiments, the reactive amino functional groups are primary amino groups.

Component (b) preferably comprises a compound of formula (I):

wherein n is 0 or a positive integer; each X is independently 0 or NH; each group $R^4$ is independently an optionally substituted alkylene, alkenylene or arylene group; and $R^5$ is hydrogen or an optionally substituted alkyl, alkenyl, aryl, alkaryl or aralkyl group provided that n is not 0 when $R^5$ is hydrogen.

In some embodiments n is no more than 300, suitably no more than 250, preferably no more than 200, preferably no more than 150, for example no more than 100.

In some embodiments n is 1.

In some embodiments n is 1 to 20.

In some embodiments n is 10 to 200, for example 10 to 100 or 10 to 50.

Each X may be the same or different.

In some embodiments, each X is O. In some embodiments, each X is NH. In some embodiments, at least one X is 0 and at least one X is NH.

Each $R^4$ is an optionally substituted alkylene, alkenylene or arylene group. Preferably each $R^4$ is an unsubstituted alkylene, alkenylene or arylene group, more preferably an unsubstituted alkylene or alkenylene group.

When $R^4$ is substituted, preferred substituents are amino and hydroxy substituents.

In some embodiments each $R^4$ is an unsubstituted alkenylene group. Suitably the alkenylene group may comprise one or more double bonds, for example one or two double bonds, suitably one double bond.

Preferably each $R^4$ is an unsubstituted alkylene group.

Each $R^4$ has at least 1 carbon atom. Suitably each $R^4$ has up to 18 carbon atoms, preferably up to 16 carbon atoms, more preferably up to 14 carbon atoms. In preferred embodiments each $R^4$ has from 1 to 12 carbon atoms, preferably from 1 to 8 carbon atoms, for example from 1 to 4 carbon atoms. Each $R^4$ may be straight chain or branched. $R^4$ may be cyclic.

In some preferred embodiments each $R^4$ is an unsubstituted alkylene group having 1 to 12, preferably 1 to 6, for example 2, 3 or 4 carbon atoms.

Each $R^4$ may be the same or different.

In some embodiments n is 1, $R^5$ is H and component (b) comprises a compound of formula (IA):

$HX^1—R^4—X^2H$ (IA)

In some embodiments $X^1$ is O and $X^2$ is NH.

In some embodiments $X^1$ and $X^2$ are both O.

In some embodiments $X^1$ and $X^2$ are both NH.

In some embodiments each X is NH, n is more than 1, $R^5$ is H and component (b) comprises a polyamine, suitably a polyalkylene polyamine.

Preferred polyalkylene polyamines are polyethylene polyamine comprising 1 to 12 ethylene groups.

In some embodiments each X is NH, n is 1, $R^5$ is H and component (b) comprises a diamine, for example an alkylene diamine.

In some embodiments each X is O, n is 1, $R^5$ is H and component (b) comprises a diol.

In some embodiments each X is O, n is 1, $R^5$ is H, $R^4$ is a hydroxy substituted alkylene group and component (b) comprises a polyol, for example a sugar or a sugar alcohol. Examples of suitable sugars include monosaccharides, disaccharides, and polysaccharides.

In some embodiments each X is O, $R^5$ is H and component (b) comprises a glycol, suitably a polyalkylene glycol. Examples of suitable polyalkylene glycols include polyethylene glycol, polypropylene glycol, polybutylene glycol, and polytetramethylene ether glycol.

In some embodiments each terminal X is NH, all other groups X are O, $R^5$ is H and component (b) comprises a polyetheramine.

Preferably in the compound of formula (I) each X is O, $R^5$ is H and each $R^4$ is $CH_2CH_2$, $CH(CH_3)CH_2$ (or $CH_2CH(CH_3)$), $CH(CH_2CH_3)CH_2$ (or $CH_2CH(CH_2CH_3)$) or $CH_2CH_2CH_2CH_2$.

Preferred polyalkylene glycols for use herein have a weight average molecular weight (Mw) of at least 100 g/mol, suitably at least 200 g/mol, for example at least 300 g/mol, for example at least 400 g/mol. Suitably the polyalkylene glycol has a weight average molecular weight of less than 3000 g/mol, suitably less than 2500 g/mol, for example less than 2200 g/mol. In preferred embodiments the polyalkylene glycol has a weight average molecular weight of from 100 to 3000 g/mol, preferably from 200 to 2500 g/mol, for example from 400 to 1500 g/mol.

In some embodiments the polyalkylene glycol may comprise a mixture of ethylene oxide derived units and propylene oxide derived units.

In some embodiments $R^5$ is not hydrogen.

In such embodiments $R^5$ is an optionally substituted alkyl, alkenyl, aryl, alkaryl or aralkyl group. Preferably $R^5$ is an unsubstituted alkyl, alkenyl, aryl, alkaryl or aralkyl group, more preferably an unsubstituted alkyl or alkenyl group.

In some embodiments $R^5$ is an unsubstituted alkyl group.

In some embodiments $R^5$ is an unsubstituted alkenyl group. Suitably the alkenyl group may comprise one or more double bonds, for example one or two double bonds, suitably one double bond.

$R^5$ suitably has at least 1 carbon atom. Suitably $R^5$ has up to 22 carbon atoms, preferably up to 20 carbon atoms, more preferably up to 18 carbon atoms. In preferred embodiments $R^5$ has from 1 to 18 carbon atoms, preferably from 1 to 12 carbon atoms, for example from 1 to 8 carbon atoms. $R^5$ may be straight chain or branched.

In some embodiments n is 0 and component (b) comprises a compound of formula (IB):

$R^5—XH$ (IB)

wherein X and $R^5$ are as defined above.

In some embodiments component (b) comprises an allylic alcohol, suitably allyl alcohol or an allyl alcohol alkoxylate. Examples of suitable allyl alcohol alkoxylates include allyl alcohol ethoxylate and allyl alcohol propoxylate.

In some embodiments component (b) comprises an alkoxylated compound, especially ethoxylated and/or propoxylated compounds.

Suitable alkoxylated compounds include polyalkylene glycols described above. Other suitable alkoxylated compounds include alkoxylated amines and diamines, alkoxylated alkanolamines and alkoxylated alcohols. Such compounds will be known to the person skilled in the art and are often available from a commercial source.

Component (b) may comprise a mixture of compounds.

In some embodiments component (b) may comprise a compound of formula (I) wherein $R^5$ is hydrogen and a compound of formula (I) wherein $R^5$ is not hydrogen, for example wherein $R^5$ is an unsubstituted alkyl or alkenyl group.

Component (a) may be obtained at least partially from renewable sources. Preferably component (a) is obtained from entirely renewable sources.

In some preferred embodiments component (a) comprises an epoxidised fatty acid ester, and component (b) comprises a compound including at least two reactive alcohol and/or amino functional groups.

In some preferred embodiments component (a) comprises a methyl ester or 2-ethylhexyl ester of an epoxidised fatty acid and component (b) comprises a polyalkylene glycol compound including at least two reactive primary alcohol and/or primary amino functional groups.

In some preferred embodiments component (a) comprises an epoxidised soybean oil methyl ester and component (b) is selected from polyethylene glycol, polytetramethylene ether glycol, polypropylene glycol, polypropylene glycol diamine and allyl alcohol ethoxylate.

In some embodiments component (b) is obtained at least partially from renewable sources. In some preferred embodiments component (b) is obtained entirely from renewable sources.

To form the surfactant of the present invention component (a) and component (b) are suitably reacted in a ratio of from 5:1 to 1:20, suitably from 3:1 to 1:10, preferably from 2:1 to 1:5, for example from 1:1 to 1:2.

Component (a) and component (b) are suitably reacted under substantially anhydrous conditions. Water produced during the reaction may be removed. Performing such a reaction and selecting appropriate conditions will be within the competence of the person skilled in the art.

Suitably component (a) and component (b) are reacted in the presence of a catalyst. Any suitable catalyst may be used and the selection of a catalyst will be within the competence of the skilled person. Suitable catalysts include Lewis acid catalysts. Suitable catalysts include boron compounds, for example boron trifluoride or boron trichloride. One preferred catalyst is boron trifluoride etherate.

Suitably the reaction of component (a) and component (b) is carried out at a temperature below 200° C., preferably below 150° C., for example below 100° C. Suitably the reaction temperature is maintained between 80 and 20° C.

As the skilled person will appreciate, the reaction product of an epoxidised fatty acid ester (a) and amino/alcohol compound (b) will depend on the nature of components (a) and (b), ratio of components used and the reaction conditions. In preferred embodiments in which component (b) comprises a compound including at least 2 amino or alcohol functional groups, a mixture of compounds may be formed.

The surfactant may include a compound of formula (IIA):

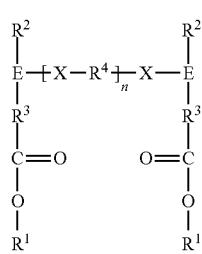

(IIA)

formed by the reaction of one molecule of component (b) and two molecules of component (a).

The surfactant may include a compound of formula (IIB):

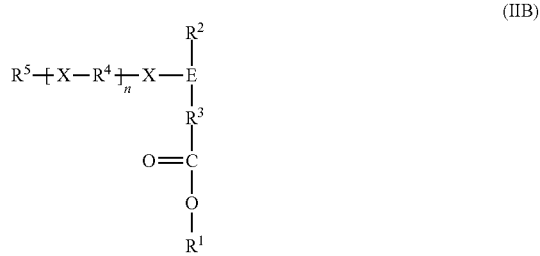

(IIB)

formed by the reaction of one molecule of component (a) and one molecule of component (b).

The surfactant may include a compound of formula (IIC):

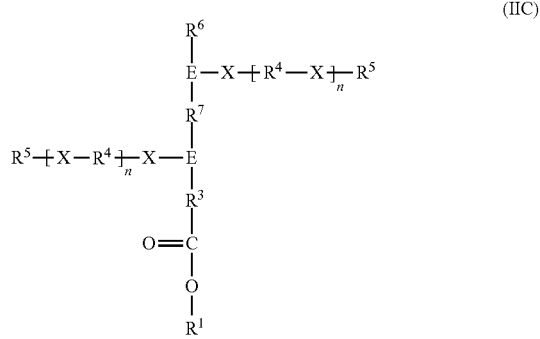

(IIC)

formed by the reaction of one molecule of component (a) and two molecules of component (b).

The skilled person will appreciate that in embodiments in which $R^5$ is not hydrogen, compounds of formula (IIA) will not form.

In embodiments in which $R^5$ is hydrogen, and the ester includes more than one epoxy functional group, more complex structures may also be formed, for example as shown in formulae (IID), (IIE) and (IIF):

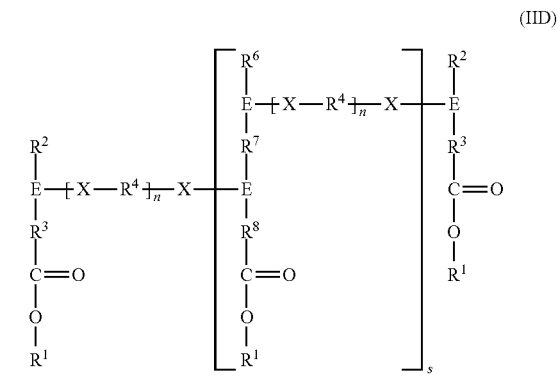

(IID)

-continued

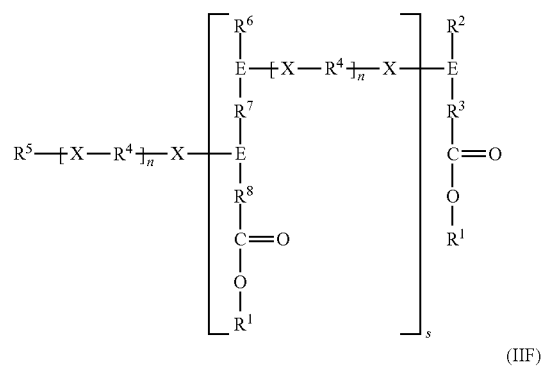
(IIE)

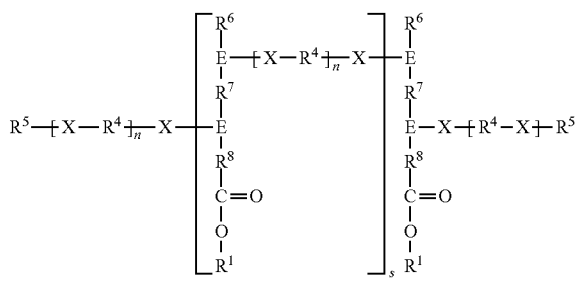
(IIF)

In each of structures (IIA), (IIB), (IIC), (IID), (IIE) and (IIF), E is the residue of an epoxy group having the structure

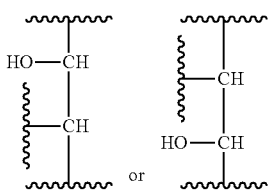

Suitably $R^2$, $R^3$, $R^6$, $R^7$, and $R^8$ are each independently optionally substituted hydrocarbyl groups, preferably unsubstituted straight chain hydrocarbyl groups. In preferred embodiments $R^2$ and $R^3$ together have a total of from 8 to 20 carbon atoms, and $R^6$, $R^7$, and $R^8$ together have a total of from 6 to 18 carbon atoms.

s is preferably from 1 to 4.

X, $R^1$, $R^4$, $R^5$, and n are as previously defined herein.

The surfactant will typically comprise a mixture of compounds having the above structures depending on the starting compounds, the ratios reacted and the reaction conditions.

In some embodiments the present invention may provide a surfactant prepared from components (a) and (b) which is further reacted.

According to a third aspect of the present invention, there is provided a derivatised surfactant comprising the reaction product of:
(a) an epoxidised carboxylic acid ester;
(b) a compound including at least one reactive alcohol and/or amino functional group; and
(c) a derivatising agent.

According to a fourth aspect of the present invention, there is provided a method of preparing a derivatised surfactant, the method comprising
(i) reacting (a) an epoxidised carboxylic acid ester with (b) a compound including at least one reactive alcohol and/or amino functional group; and (ii) reacting the reaction product of step (i) with (c) a derivatising agent.

Components (a) and (b) are suitably as defined in relation to the first and second aspect.

Step (i) of the fourth aspect preferably involves carrying out the reaction of the second aspect and preferred features of step (i) are as defined in relation to the method of the second aspect.

Further preferred features of the invention will now be described.

Component (c) suitably comprises a compound which can react with a functional group present in the reaction product of step (i).

The derivatising agent (c) is a compound capable of reacting with a functional group present in the reaction product of component (a) and component (b).

Functional groups which may be present in the reaction product of component (a) and component (b) include esters, alkenes, hydroxy, epoxy and amino groups.

These functional groups may be present within the residue of component (a), for example an ester functional group or an alkene or residual epoxy group.

These functional groups may alternatively or additionally be present in the residue of component (b), for example a hydroxy or amino group. When component (b) comprises a compound of formula $R^5$—[X—$R^4$]—XH and $R^5$ is not hydrogen, $R^5$ may contain a functional group, for example a halide or alkene moiety. In some preferred embodiments $R^5$ comprises a terminal alkene group.

The derivatising agent (c) is suitably selected depending on the functional group present in the reaction product of component (a) and component (b).

Suitably the derivatising agent includes a first functional group able to react with the reaction product of component (a) and component (b) and a second functional group.

In some embodiments the derivatising agent (c) may undergo an addition reaction with the reaction product of component (a) and component (b), for example to a double bond.

Suitably reaction with component (c) introduces a polar functional group into the derivatised surfactant. This polar functional group may be selected from anionic, non-ionic or cationic functional groups.

The polar functional group may be selected from a sulfonate moiety, a sulfate moiety, a carboxylate moiety, a quaternary ammonium moiety, a phosphonate moiety, a phosphate moiety, a hydroxy group, an amino group and/or an alkoxylated chain.

In some embodiments component (c) comprises a hydrolysis agent. Such compounds may hydrolyse an ester moiety within the reaction product of component (a) and component (b), suitably the ester residue of component (a). The species formed suitably comprises a carboxylate moiety. Conditions for carrying out such reactions will be well known to the skilled person.

Suitable hydrolysis agents will be known to the skilled person. Hydrolysis may be carried out under basic or acidic conditions. Examples of suitable basic hydrolysis agents include sodium hydroxide, potassium hydroxide and ammonium hydroxide. Acidic hydrolysis may be carried out in the presence of any strong acid. Neutralisation may follow to provide an alkali metal, amine or ammonium salt.

In some embodiments component (c) comprises a compound including at least one reactive alcohol or amino functional group.

Such compounds may react with a substituted leaving group within the residue of the epoxidised carboxylic acid ester (a) or component (b). Suitably such groups undergo a trans-esterification or amidation reaction with the ester residue of component (a). Conditions for carrying out such reactions will be well known to the skilled person.

In embodiments where component (c) includes a compound having a reactive alcohol functional group, the reactive alcohol functional group is suitably a primary alcohol group or a secondary alcohol group. In preferred embodiments, the reactive alcohol functional group is a primary alcohol group.

In embodiments where component (c) includes a compound having a reactive amino functional group, the reactive amino functional group is suitably a primary amino group or a secondary amino group. In preferred embodiments, the reactive amino functional group is a primary amino group.

In some embodiments component (c) comprises a compound of formula (III):

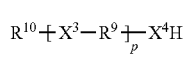
(III)

wherein p is 0 or a positive integer, each $X^3$ is independently O or $NR^{11}$, $X^4$ is O or $NR^{12}$, each $R^9$ is independently an optionally substituted alkylene, alkenylene or arylene group, and each of $R^{10}$, $R^{11}$ and $R^{12}$ is hydrogen or an optionally substituted alkyl, alkenyl, aryl, alkaryl or aralkyl group.

Preferably p is a positive integer.

In some embodiments p is no more than 300, suitably no more than 250, preferably no more than 200, preferably no more than 150, for example no more than 100.

In some embodiments p is 1.

In some embodiments p is 1 to 20.

In some embodiments p is 10 to 200, for example 10 to 100 or 10 to 50.

Each $X^3$ may be the same or different.

In some preferred embodiments $R^{11}$ is H and $X^3$ is O or NH.

In some embodiments, each $X^3$ is O or NH. In some embodiments, at least one $X^3$ is O and at least one $X^3$ is NH. In preferred embodiments each $X^3$ is O.

In some embodiments each $X^3$ is O and $X^4$ is O. In some embodiments each $X^3$ is O and $X^4$ is NH.

Each $R^9$ is an optionally substituted alkylene, alkenylene or arylene group. Preferably each $R^9$ is an unsubstituted alkylene, alkenylene or arylene group, more preferably an unsubstituted alkylene or alkenylene group.

When $R^9$ is substituted, preferred substituents are amino and hydroxy substituents.

In some embodiments each $R^9$ is an unsubstituted alkenylene group. Suitably the alkenylene group may comprise one or more double bonds, for example one or two double bonds, suitably one double bond.

Preferably each $R^9$ is an unsubstituted alkylene group.

Each $R^9$ has at least 1 carbon atom. Suitably each $R^9$ has up to 18 carbon atoms, preferably up to 16 carbon atoms, more preferably up to 14 carbon atoms. In preferred embodiments each $R^9$ has from 1 to 12 carbon atoms, preferably from 1 to 8 carbon atoms, for example from 1 to 4 carbon atoms. Each $R^9$ may be straight chain or branched. $R^9$ may be cyclic.

In some preferred embodiments each $R^9$ is an unsubstituted alkylene group having 1 to 12, preferably 1 to 6, for example 2, 3, or 4 carbon atoms.

Each $R^9$ may be the same or different.

$R^{10}$ is hydrogen or an optionally substituted alkyl, alkenyl, aryl, alkaryl or aralkyl group. Preferably $R^{10}$ is not hydrogen. Preferably $R^{10}$ is an unsubstituted alkyl, alkenyl, aryl, alkaryl or aralkyl group, more preferably an unsubstituted alkyl or alkenyl group.

When $R^{10}$ is substituted, hydroxy substituents are preferred.

In some embodiments $R^{10}$ is an unsubstituted alkenyl group. Suitably the alkenyl group may comprise one or more double bonds, for example one or two double bonds, suitably one double bond.

In preferred embodiments $R^{19}$ is an alkyl group. Preferred alkyl groups are unsubstituted alkyl groups and hydroxy substituted alkyl groups. Unsubstituted alkyl groups are especially preferred.

$R^{19}$ has at least 1 carbon atom. Suitably $R^{19}$ has up to 22 carbon atoms, preferably up to 20 carbon atoms, more preferably up to 18 carbon atoms. In preferred embodiments $R^{19}$ has from 1 to 18 carbon atoms, preferably from 1 to 12 carbon atoms, for example from 1 to 8 carbon atoms. $R^{19}$ may be straight chain or branched.

In some embodiments component (c) comprises an alkoxylated compound.

Suitable alkoxylated compounds include alkoxy polyalkylene glycols and alkoxy polyalkylene glycol amines, wherein the polyalkylene glycol portion is preferably selected from polyethylene glycol, polypropylene glycol, polybutylene glycol, polytetramethylene ether glycol, and copolymers thereof, and the alkoxy portion is preferably selected from methoxy, ethoxy, propoxy, and butoxy.

Examples of suitable alkoxy polyalkylene glycols and alkoxy polyalkylene glycol amines include methoxy polyethylene glycol, butoxy polypropylene glycol, and butoxy poly(ethylene glycol-co-propylene glycol) amine.

In some embodiments p is 1, $R^{10}$ is hydrogen, $X^3$ is O or NH and $R^4$ is O, NH or $NR^{12}$ wherein $R^{12}$ is preferably an alkyl group or a hydroxy alkyl group.

In some embodiments $R^{19}$ is alkyl, preferably unsubstituted alkyl or hydroxy alkyl, p is 0 and $X^4$ is $NR^{12}$ wherein $R^{12}$ is alkyl, preferably unsubstituted alkyl or hydroxy alkyl.

In some embodiments component (c) may be a primary or secondary amine, for example an alkyl amine, a dialkyl amine, a alkanolamine or a dialkanolamine. Such compounds typically include 1 to 12 carbon atoms in each alkyl or hydroxy alkyl group, preferably from 1 to 8 carbon atoms, most preferably from 1 to 4 carbon atoms.

Examples of suitable compounds of this type include monoethanolamine, monoisopropanolamine, diethanolamine, and diisopropanolamine.

In some embodiments $R^{10}$ is alkyl, preferably $C_1$ to $C_{14}$ alkyl, $X^3$ is $NR^{11}$ and $R^{11}$ is alkyl, preferably $C_1$ to $C_{14}$ alkyl, $R^9$ is alkylene and $X^4$ is NH or O.

Such compounds may react to form a species which further includes a tertiary amine. This tertiary amine group can be reacted with a quaternising agent to introduce cationic functionality into the molecule.

Examples of suitable compounds of this type include dimethylaminopropylamine (DMAPA), dimethylaminopropanol and dimethylaminoethanol.

Other suitable compounds of this type will be known to the person skilled in the art.

In some embodiments, the derivatised surfactant is prepared by
 (i) reacting (a) an epoxidised carboxylic acid ester with (b) a compound including at least one reactive alcohol and/or amino functional group;
 (ii) reacting the reaction product of step (i) with (c) a derivatising agent comprising a compound including at least one reactive alcohol or amino functional group and one tertiary amino group; and
 (iii) reacting the reaction product of step (ii) with (d) a quaternising agent.

Suitable quaternising agents will be known to the skilled person. Examples of suitable quaternising agents include dimethyl sulfate, diethyl sulfate, methyl chloride, methyl bromide, benzyl chloride, monochloroacetic acid and epoxides in combination with an acid.

In embodiments where the reaction product of component (a) and component (b) comprises an alkene functional group component (c) may comprise a sulfonating agent.

Suitable sulfonating agents will be known to the skilled person. Examples of suitable sulfonating agents include sodium bisulfite, sodium metabisulfite, potassium bisulfite, and potassium metabisulfite.

Selection of suitable reaction conditions and ratios of reagents for carrying out step (ii) of the method of the fourth aspect will be within the competence of the skilled person.

In some embodiments a catalyst will be needed.

Suitable catalysts will be known to the person skilled in the art.

According to a fifth aspect of the present invention, there is provided a composition comprising a surfactant according to the first or third aspect of the present invention, and one or more further components.

The amount of surfactant present in the composition will depend on the intended use of the composition and the presence of other components.

In some embodiments, the fifth aspect provides a composition comprising a surfactant of the first or third aspect and a diluent or carrier.

Preferably the composition of fifth aspect is an aqueous composition. Preferably water is the main solvent present in the composition. By this we mean that water preferably accounts for at least 50 wt % of all solvents present in the composition, preferably at least 60 wt %, more preferably at least 70 wt %, for example at least 80 wt % or at least 90 wt %.

The composition may further comprise one or more additional solvents. Preferred solvents are water miscible solvents, for example alcohols.

In some embodiments, the composition of the fifth aspect further comprises a pigment.

In some embodiments, the composition of the fifth aspect is a dispersant composition.

In some embodiments, the composition of the fifth aspect is a detergent composition.

In some embodiments, the composition of the fifth aspect is a personal care composition.

In some embodiments, the composition of the fifth aspect is a toiletries composition.

In some embodiments, the composition of the fifth aspect is an oilfield composition.

In some embodiments, the composition of the fifth aspect is a lubricant composition.

In some embodiments, the composition of the fifth aspect is a fuel composition.

In some embodiments, the composition of the fifth aspect is an agrochemical composition.

In some embodiments, the composition of the fifth aspect is a coating composition.

In some embodiments, the composition of the fifth aspect is a cosmetic composition.

In some embodiments, the composition of the fifth aspect is an emulsion polymer composition.

According to a sixth aspect of the present invention, there is provided the use of the reaction product of:
 (a) an epoxidised carboxylic acid ester;
 (b) a compound including at least one reactive alcohol and/or amino functional group; and optionally
 (c) a derivatising agent;
 as a surfactant.

The use of the sixth aspect may be as a dispersant in the fields of inks, paints, pigment preparations, dispersions, detergents, personal care, toiletries agrochemicals, oilfields, lubricants, fuels, coatings, cosmetics and emulsion polymers.

The use of the sixth aspect may be as an emulsifier.

The invention will now be further described with reference to the following non-limiting examples.

EXAMPLES

Example 1

Reaction of Epoxidised Methyl Soyate (Soybean Oil Methyl Ester) with Polyethylene Glycol 200 Molecular Weight 284.8 grams of epoxidised soyate with an epoxide value of 227 mg KOH/g was placed into a flask. 115.2 grams of 200 molecular weight polyethylene glycol (1:1 equivalents epoxy to hydroxy) was then added. The mixture was dried to a water content of <0.1%, then cooled to 20° C. 0.32 grams of boron trifluoride etherate catalyst was added, and the reaction was cooled to maintain the temperature below 60° C. The reaction was continued until the epoxide value of the mixture was <1 mg KOH/g.

Example 2

Reaction of Epoxidised Methyl Soyate with Polyethylene Glycol 200 Molecular Weight 221.1 grams of epoxidised soyate with an epoxide value of 227 mg KOH/g was placed into a flask. 178.9 grams of 200 molecular weight polyethylene glycol (1:2 equivalents epoxy to hydroxy) was then added. The mixture was dried to a water content of <0.1%, then cooled to 20° C. 0.32 grams of boron tetrafluoride etherate catalyst was added, and the reaction was cooled to maintain the temperature below 60° C. The reaction was continued until the epoxide value of the mixture was <1 mg KOH/g.

Example 3

Reaction of Epoxidised Methyl Soyate with Polyethylene Glycol 600 Molecular Weight 180.7 grams of epoxidised soyate with an epoxide value of 227 mg KOH/g was placed into a flask. 219.3 grams of 600 molecular weight polyethylene glycol (1:1 equivalents epoxy to hydroxy) was then added. The mixture was dried to a water content of <0.1%, then cooled to 30° C. 0.32 grams of boron tetrafluoride etherate catalyst was added, and the reaction was cooled to maintain the temperature below 60° C. The reaction was continued until the epoxide value of the mixture was <1 mg KOH/g.

Example 4

Reaction of Epoxidised Methyl Soyate with Polyethylene Glycol 1500 Molecular Weight 99.1 grams of epoxidised soyate with an epoxide value of 210 mg KOH/g was placed into a flask. 300.9 grams of 1500 molecular weight polyethylene glycol (1:1 equivalents epoxy to hydroxy) was then added. The mixture was dried to a water content of <0.1%, then cooled to 60° C. 0.32 grams of boron tetrafluoride etherate catalyst was added, and the reaction was cooled to maintain the temperature below 80° C. The reaction was continued until the epoxide value of the mixture was <1 mg KOH/g.

Example 5

Reaction of Epoxidised Methyl Soyate with Polytetrahydrofuran 650 Molecular Weight 172.8 grams of epoxidised soyate with an epoxide value of 210 mg KOH/g was placed into a flask. 227.2 grams of 650 molecular weight polytetrahydrofuran (1:1 equivalents epoxy to hydroxy) was then added. The mixture was dried to a water content of <0.1%, then cooled to 60° C. 0.32 grams of boron tetrafluoride etherate catalyst was added, and the reaction was cooled to maintain the temperature below 80° C. The reaction was continued until the epoxide value of the mixture was <1 mg KOH/g.

Example 6

Reaction of Epoxidised Methyl Soyate with a 400 Molecular Weight Polyether Diamine Based on Polypropylene Glycol 213.8 grams of epoxidised soyate with an epoxide value of 210 mg KOH g was placed into a flask. 186.2 grams of 400 molecular weight polyether diamine (1:1 equivalents epoxy to amine) was then added. With a water content of <0.1% the reaction mixture was heated to 120 to 140° C., and the reaction was continued until the epoxide value of the mixture was <1 mg KOH/g.

Example 7

Reaction of Epoxidised Methyl Soyate with 500 Molecular Weight Allyl Alcohol Ethoxylate 132.3 grams of epoxidised soyate with an epoxide value of 210 mg KOH/g was placed into a flask. 267.9 grams of 500 molecular weight allyl alcohol ethoxylate (1:1 equivalents epoxy to hydroxy) was added. The mixture was dried to a water content of <0.1%, then cooled to 60° C. 0.32 grams of boron tetrafluoride etherate catalyst was added, and the reaction was cooled to maintain the temperature below 80° C. The reaction was continued until the epoxide value of the mixture was <1 mg KOH/g.

Example 8

Derivatisation of Example 3 by Transesterification of the Ester Group with a Methyl Initiated Poly Ethylene Glycol of 500 Molecular Weight (MPEG500)

231.5 grams of example 3 was placed in a flask. 168.5 grams of MPEG500 was then added. The mixture was dried to a water content of <0.1%, then cooled to 60° C. 1% of 20% sodium methoxide catalyst was then added, and vacuum was applied to distil the methanol from the catalyst and by-product from the reaction. The reaction mixture was slowly heated to a maximum of 90° C. until distillation stopped.

Example 9

Derivatisation of Example 3 by Transesterification of the Ester Group with a Methyl Initiated Poly Ethylene Glycol of 1000 Molecular Weight (MPEG1000)

162.9 grams of example 3 was placed in a flask. 237.1 grams of MPEG1000 was then added. The mixture was dried to a water content of <0.1%, then cooled to 60° C. 1% of 20% sodium methoxide catalyst was then added, and vacuum was applied to distil the methanol from the catalyst and by-product from the reaction. The reaction mixture was slowly heated until distillation stopped.

Example 10

Derivatisation of Example 3 by Amidation of the Ester Group with a Butyl Initiated Polyethylene/Polypropylene Glycol of 2000 Molecular Weight Polyether Amine 102.2 grams of example 3 was placed in a flask. 297.8 grams of polyether amine was then added. The mixture was dried to a water content of <0.1%, then cooled to 60° C. 1% of 20% sodium methoxide catalyst was then added, and vacuum was applied to distil the methanol from the catalyst and by-product from the reaction. The reaction mixture was slowly heated to a maximum of 90° C. until distillation stopped.

Example 11

Derivatisation of Example 5 by Transesterification of the Ester Group with a Butyl Initiated Polypropylene Glycol of 1200 Molecular Weight (BPPG1200)

150.3 grams of example 3 was placed in a flask. 249.7 grams of BPPG1200 was then added. The mixture was dried to a water content of <0.1%, then cooled to 60° C. 1% of 20% sodium methoxide catalyst was then added, and vacuum was applied to distil the methanol from the catalyst and by-product from the reaction. The reaction mixture was slowly heated to a maximum of 90° C. until distillation stopped.

Example 12

Derivatisation of Example 3 by Amidation of the Ester Group with Diethanolamine 102.2 grams of example 3 was placed in a flask. 297.8 grams of diethanolamine was then added. The mixture was dried to a water content of <0.1%, then cooled to 60° C. 1% of 20% sodium methoxide catalyst was then added, and vacuum was applied to distil the methanol from the catalyst and by-product from the reaction. The reaction mixture was slowly heated to a maximum of 90° C. until distillation stopped. The reaction mixture was then allowed to equilibrate at 60° C. for 3 hours.

Example 13

Derivatisation of Example 7 by Sulfonation Using Sodium Bisulfite 89.9 grams of example 7 was placed in a flask with 279.5 grams of water. 29.5 grams of sodium metabisulfite was then added with 1.1 grams of a 50% sodium hydroxide solution, and the reaction mixture was slowly heated to 90-95° C. The reaction was monitored by anionic surfactant content and was continued until the value became constant.

Example 14

Derivatisation of Example 1 by Amidation of the Ester Group with Dimethylaminopropylamine (DMAPA)

312.4 grams of example 1 was placed in a flask and dried to <0.1% water content. 87.6 grams of DMAPA was then added (10% molar excess). The temperature was adjusted to 60° C., then 1% of 20% sodium methoxide catalyst was added, and the reaction mixture was slowly heated to 140° C. to distil the methanol from the catalyst and by-product from the reaction until distillation stopped. Once methanol distillation stopped, vacuum was applied and the reaction mixture was heated to 150° C. until the distillation of the excess DMAPA was complete.

Example 15

Derivatisation of Example 14 to Form a Betaine by Reaction with Monochloroacetic Acid 110 grams of example 14 was charged to a flask along with 264.9 grams of water. 25.1 grams of monochloroacetic acid was then added. The pH was adjusted to 9.5-10.5 with 50% sodium hydroxide solution, and the reaction mixture was heated to 85° C. With the pH being maintained in the range 9.5-10.5, the reaction was continued until the base value was constant and <5.0 mg KOH/g.

Example 16

Reaction of Epoxidised Methyl Soyate with Polyethylene Glycol 200 Molecular Weight 221.1 grams of epoxidised soyate with an epoxide value of 227 mg KOH/g was placed into a flask. 178.9 grams of 200 molecular weight polyethylene glycol (1:2 equivalents epoxy to hydroxy) was then added. The mixture was dried to a water content of <0.1%, then cooled to 20° C. 0.32 grams of boron tetrafluoride etherate catalyst was added, and the reaction was cooled to maintain the temperature below 60° C. The reaction was continued until the epoxide value of the mixture was <1 mg KOH/g. The final product had a saponification value of 129.2 mg KOH/g. 110 grams of this material was dispersed in 277.8 grams of water, and 12.2 grams of sodium hydroxide (a 20% molar excess of the quantity required for full hydrolysis) was then added. This mixture was heated to 95° C. for 12 hours, after which the reaction mixture was neutralized to pH 10.5 with acetic acid.

The invention claimed is:

1. A method of preparing a surfactant, the method comprising:
    step (i) reacting:
    (a) an epoxidised carboxylic acid ester; and
    (b) a compound of formula (I):

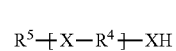

(I)

wherein n is a positive integer; each X is independently O or NH; each group $R^4$ is independently an optionally substituted alkylene, alkenylene or arylene group; and $R^5$ is hydrogen or an optionally substituted alkyl, alkenyl, aryl, alkaryl or aralkyl group; and
    step (ii) reacting the reaction product of step (i) with (c) a derivatising agent comprising an alkoxy polyalkylene glycol, an alkoxy polyalkylene glycol amine, an alkyl amine, a dialkyl amine, an alkanolamine, a dialkanolamine or a sulfonating agent.

2. The method according to claim 1 wherein the epoxidised carboxylic acid ester is an ester of formula $RCOOR^1$ in which R is a hydrocarbyl group including an epoxy functional group and $R^1$ is a hydrocarbyl group.

3. The method according to claim 2 wherein R is an unbranched aliphatic group having 6 to 26 carbon atoms and $R^1$ is methyl or 2-ethylhexyl.

4. The method of claim 2 wherein $R^1$ is methyl.

5. The method according to claim 1 wherein the epoxidised carboxylic acid ester is derived from soybean oil fatty acid.

6. The method according to claim 1 wherein each X is O, n is 20 to 100, $R^5$ is hydrogen and each $R^4$ is a C2 to C4 alkylene group.

7. The method according to claim 1
    (iii) further comprising reacting the reaction product of step (ii) with (d) a quaternising agent.

8. The method of claim 1 wherein the weight/weight ratio of components (a) and (b) is of from 5:1 to 1:20.

9. The method of claim 1 wherein the step (i) reaction occurs under anhydrous conditions.

10. The method of claim 1 wherein the step (i) reaction occurs in the presence of a Lewis acid catalyst.

11. The method of claim 10 wherein the catalyst is boron trifluoride or boron trichloride.

12. The method of claim 1 wherein the step (i) reaction occurs at a temperature between 80° C. and 20° C.

13. A surfactant made by the method according to claim 1.

14. A method of reducing a surface tension at an interface, the method comprising applying a composition to the interface, the composition comprising the surfactant according to claim 13.

15. A composition comprising the surfactant of claim 13 and a diluent or carrier.

16. The composition according to claim 15 further comprising an ingredient selected from the group consisting of an ink, a paint, a pigment, a dispersant, a detergent, a lubricant, a fuel, an agrochemical, a coating, a cosmetic and an emulsion polymer.

* * * * *